United States Patent [19]
Siegmund

[11] 3,907,336
[45] Sept. 23, 1975

[54] PIPE LINE WITH A SAFETY EQUIPMENT FOR TRANSPORTING PUMPABLE MEDIUMS

[75] Inventor: Werner Siegmund, Mannheim, Germany

[73] Assignee: Hansen Neuerburg, Export-Import GmbH, Essen, Germany

[22] Filed: Feb. 11, 1974

[21] Appl. No.: 436,193

[30] Foreign Application Priority Data
    Jan. 25, 1973   Germany............................ 2304919

[52] U.S. Cl..................................... 285/93; 285/45
[51] Int. Cl.² ......................................... F16L 55/00
[58] Field of Search ........... 285/93, 138, 13, 14, 45, 285/47; 137/312, 314, 375

[56]         References Cited
          UNITED STATES PATENTS
| | | | |
|---|---|---|---|
| 1,140,633 | 5/19/15 | Trucano................................ | 285/47 |
| 1,202,687 | 10/1916 | Elkerton............................... | 285/13 |
| 1,497,652 | 6/1924 | Browne................................. | 285/13 |
| 3,053,554 | 9/1962 | Magos et al. ...................... | 285/93 X |
| 3,184,958 | 5/1965 | Eaton................................ | 137/375 X |
| 3,209,198 | 9/1965 | Long et al....................... | 285/138 X |
| 3,213,889 | 10/1965 | Cotman .......................... | 285/138 X |
| 3,360,001 | 12/1967 | Anderson........................... | 137/375 |
| 3,721,270 | 3/1973 | Wittgenstein................... | 137/312 X |

FOREIGN PATENTS OR APPLICATIONS
2,028,054   1/1971   Germany .............................. 285/47

*Primary Examiner*—Werner H. Schroeder
*Assistant Examiner*—Wayne L. Shedd
*Attorney, Agent, or Firm*—Ralf H. Siegemund

[57]         ABSTRACT
A pipe line with a safety equipment for transporting pumpable mediums. The safety equipment comprises an annular chamber which circumferentially embraces a circumferential welding seam between adjacent tube sections and the welded areas on both sides of said welding seams. There is further a leakage detector connected to the circumferential chamber for detecting and indicating any medium leaking through a flaw in the welded seam into the circumferential chamber by means of an indicating device.

8 Claims, 6 Drawing Figures

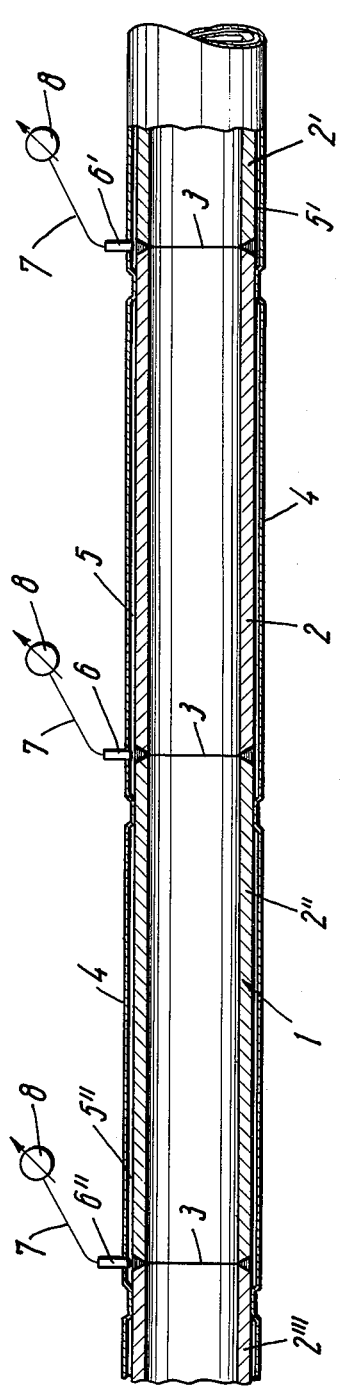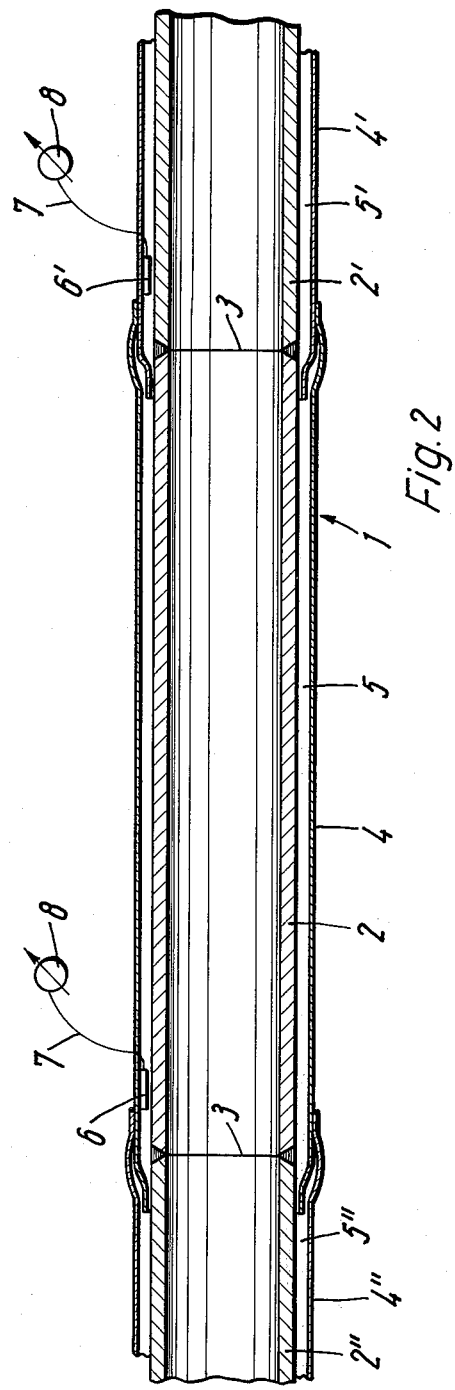

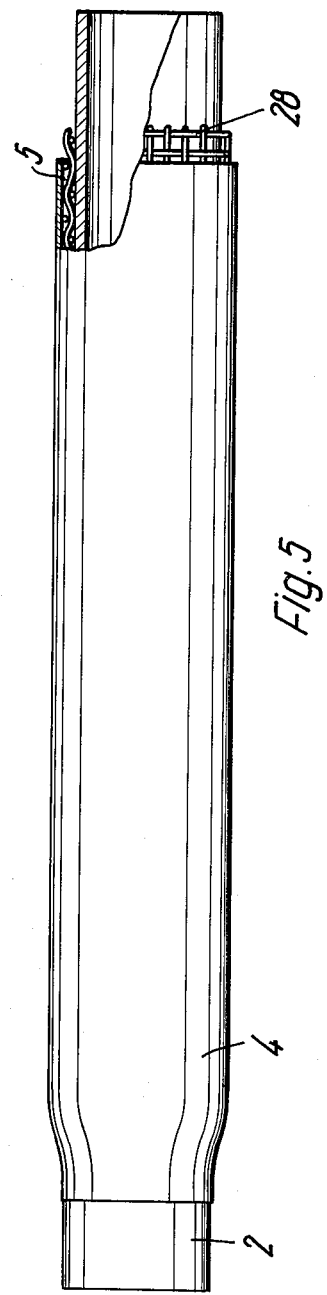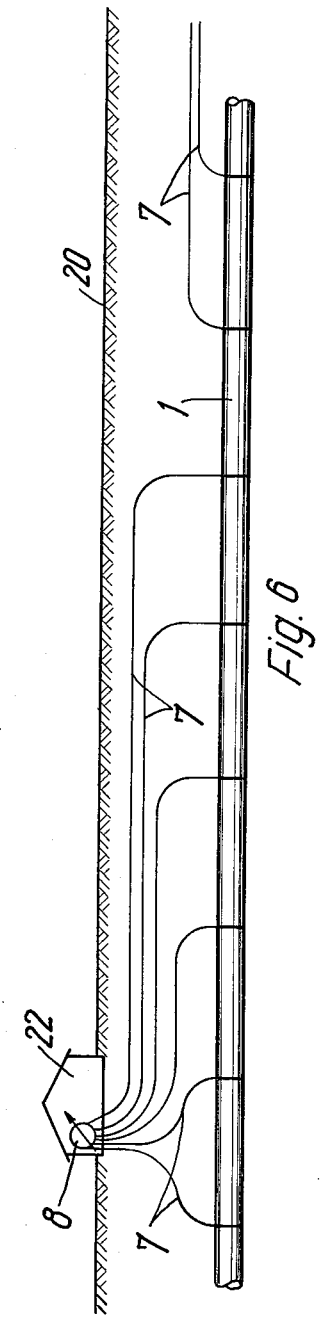

PIPE LINE WITH A SAFETY EQUIPMENT FOR TRANSPORTING PUMPABLE MEDIUMS

This invention relates to a pipe line with a safety equipment for transporting pumpable mediums, the safety equipment comprising an annular chamber circumferentially embracing the circumferential welding seam between adjacent tube sections and the welded areas on both sides of said welding seam, and a leakage detector connected to the circumferential chamber for detecting and indicating any medium leaking through a flaw in the circumferential chamber by means of an indicating device.

It is generally assumed that leakages, if any, will occur in the area of the welding seams interconnecting adjacent pipe sections and thus leakage detectors are associated with each circumferential welding seam.

According to the known state of the art, there is an electric safety system for oil pipe lines and oil tanks, which has separate, independent oil detectors distributed over the length of the pipe line and releasing an electric signal in case local leakage occurs. Sensitivity of such system of course depends upon the oil detector spacing, as it will last some time until leaking liquid will enter the area of the next leakage detector. In an effort to prevent leaking oil from flowing into the soil, particularly in environments of especially protected type, and from influencing drinking water supply, it was already suggested to accommodate the complete oil alarm system in the plastic coating of the pipe line. Said coating shall retain the leakage oil and hence provide the possibility of very fast indication and localization of the leakage. However, this idea requires that leaking oil can flow well between the steel pipe and the plastic coating thereof. However, this cannot be realized in practice, because the insulating effect to be provided by the plastic coating would at least be affected considerably. As a matter of fact, in case the plastic insulation were not tight at any position, e.g. in the area of passage through an inspection pit, entering water might well accumulate between insulation and steel pipe and might progressively destroy a considerable end of said pipe. Finally, it is to be considered that leaking oil may enter the detecting area of several oil detectors so that release of alarm signals by several indicating devices will result and it cannot be determined later, where leakage actually occurred. In such case, it may be necessary to check a very large end of the pipe line.

It is the object of the present invention to provide a pipe line each section of which is monitored by the safety equipment, while the aforedescribed disadvantages will be avoided.

According to the invention, the circumferential chamber extends in longitudinal direction of the pipe line up to the area of the adjacent circumferential chamber. Thus it is guaranteed that oil leaking in the area of one circumferential chamber will immediately result in release of an indication and that it can be directly seen from this indication where the damage occurred, whereas the risk that leaking oil or gas will spread along the pipe line is avoided.

In order to cover the joint between two circumferential chambers, where the oil might pass through a damaged insulation without flowing into one of the two adjacent circumferential chambers, it is proposed according to a further feature of the invention that adjacent circumferential chambers overlap each other although they are not interconnected. Conveniently, the circumferential chambers extend from one end of each pipe section near the welded area thereof to the welded area of the adjacent pipe section connected to the opposite end of the aforementioned section.

Further embodiments of the invention are described in the subclaims. Subclaim 7 referring to economic prefabrication of the pipe sections necessary for producing the pipe line should be appreciated especially, said pipe section being characterized by the fact that the central portion thereof is provided with a sleeve, the one end of which is tightly connected, preferably glued to one pipe end, whereas the other sleeve end is open adjacent the other end of the pipe section.

Preferred embodiments of the invention will now be described by way of example and with reference to the accompanying drawings, in which FIG. 1 is a longitudinal section through a pipe line portion surrounded by circumferential chambers in contact with one another;

FIG. 2 is a longitudinal section similar to FIG. 1 and provided with circumferential chambers overlapping each other;

FIG. 5 is a longitudinal view of a pipe section prepared for establishing the pipe line according to the invention; and FIG. 6 is a view showing an underground pipe line, several control areas of which are connected to a detecting station.

Figure 3:
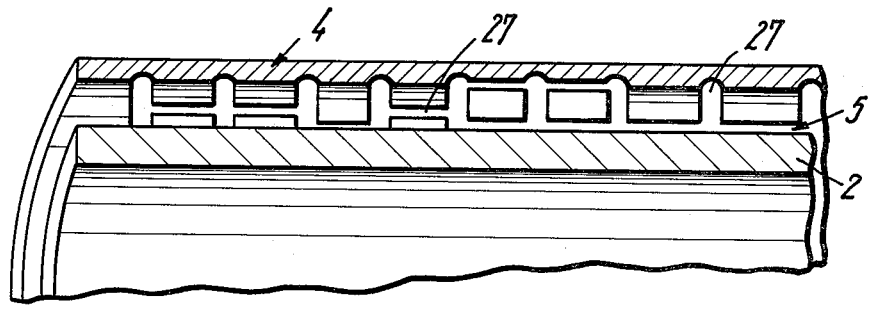
FIG. 3 is a detail of a tube section, partly in section, the circumferential chamber of which consists of recessed sleeve portions.

FIG. 1 shows a portion of a pipe line for transporting pumpable mediums, which consists of several pipe sections 2, 2', 2'', 2''' interconnected by means of welding seams 3. Each welding seam 3 connecting two adjacent pipe sections 2, 2' or 2'', respectively, is surrounded by a circumferential chamber 5 by means of a corresponding sleeve 4. A leakage detector 6, 6', 6'', respectively, is connected to each of the circumferential chambers 5, 5', 5'' and is also connected to an indicating device 8 through a wire 7. The sleeve 4 proper may be the external insulation, although alternatively it might be provided with an additional external insulation, not shown. Conveniently, the leakage detectors 6, 6', 6'' are arranged directly in the area of the respective welding seams 3, since this is the position where occurrence of leakage is most liable. However, the leakage detectors may be arranged at any other position of the circumferential chamber 5, as the essential idea of the invention resides in providing each welding seam with a separate leakage detector.

In FIG. 2, adjacent circumferential chambers 5, 5' or 5'' overlap each other.

FIG. 3 shows a detail of a pipe section 2, which is embraced by a sleeve 4, the internal surface of which has interconnected recesses 27 forming the circumferential chamber 5.

Figure 4:
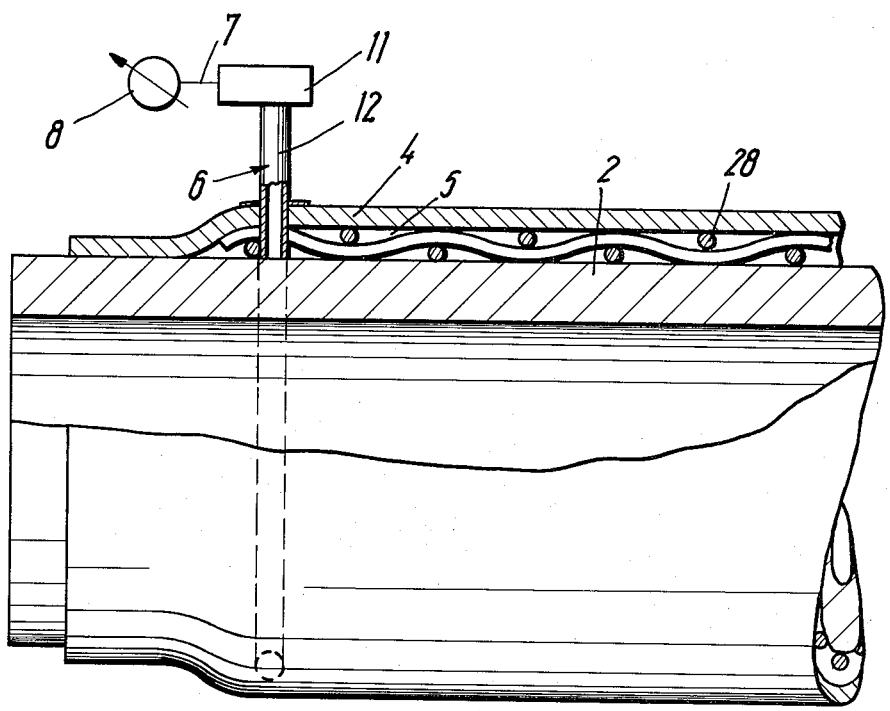
FIG. 4 is a pipe portion, the circumferential chamber of which accommodates a permeable grating.

FIG. 4 shows the alternative of supporting the sleeve 4 by means of a grating 28, which keeps the circumferential chamber 5 open even under considerable external loads and and thus enables leaking medium to flow through the circumferential chamber 5 in any event. This Figure also shows how a hose 12 serving as leakage detector 6 is tightly guided through the sleeve. Said hose 12 extends down to the bottom of the circumferential chamber 5 and the other end thereof is connected to a pressure box 11. Any medium entering the circumferential chamber 5 results in increased pressure in said chamber, whereby an alarm circuit through the wire 7 is closed through the pressure box 11, in which a switch actuated by said box is provided, and finally the indicating device 8 will indicate the leakage.

FIG. 5 shows a tube prepared in the shop, the sleeve 4 of said tube being tightly glued thereto in one end area thereof, while the other sleeve end is open. The tube shown in FIG. 5 thus already is provided with part of the circumferential chamber 5, which is to be completed at the construction site by laying a grating 28 around the welding seam area and the non-embraced free areas of the two tube ends after providing the welding seam and by closing the sleeve 4 by means of a corresponding sleeve portion.

FIG. 6 shows an underground pipe line 1 according to the invention, several connecting wires 7 of the corresponding control areas being connected to a control station 22.

I claim:

1. In a pipeline having a plurality of pipe sections interconnected by welding, there being a welding seam between respective adjacent two of said sections, with a safety equipment for transporting pumpable mediums comprising a plurality of annular chambers, each circumferentially embracing but one of the circumferential welding seams between respective two adjacent tube sections and the welded areas on both sides of said welding seam, so that the interior of each said chambers includes a single welding seam; and a plurality of leakage detectors respectively connected to the circumferential chambers and disposed for immediate response to a leak particularly of or near the respectively associated seam for detecting and indicating any medium leaking through a flaw and into the respective circumferential chamber by means of an indicating device each circumferential chamber having one end adjacent to the respectively associated welding seam and extending in longitudinal direction of the pipe line up to the area of the respectively adjacent circumferential chamber, but being separated therefrom, so that the chambers are unable to communicate with each other.

2. In a pipe line as claimed in claim 1, wherein adjacent circumferential chambers (5, 5' or 5, 5'') overlap each other in axial direction.

3. In a pipe line as claimed in claim 1, wherein the circumferential chambers (5', 5, 5'') extend from one end of each pipe section near the welded area thereof to the welded area of the adjacent pipe section (2) connected to the opposite end of the aforementioned section (2') with the welding seam (3') being covered by the respective chamber.

4. In a pipe line as claimed in any one of claims 1, wherein a sleeve (4), which is medium-tight and which forms the annular chamber (5), is supported on the pipe inside the chamber (5) at a plurality of positions.

5. In a pipe line as claimed in claim 4, wherein the internal surface of the sleeve (4) has interconnected recesses (27) in the area of the annular chamber, said recesses constituting the annular chamber (5).

6. In a pipe line as claimed in claim 4, wherein a grating (28) supporting the sleeve (4) and providing a flow area for leaking medium in the circumferential chamber (5) is arranged in the circumferental chamber (5) between the sleeve (4) and the pipe section (2).

7. In a pipe section for building a pipe line as claimed in claim 1 wherein said section, except the end portions thereof, is provided with a sleeve (4), which is tightly connected, preferably glued to the tube section (2) in the area of one end thereof and which is open at the other end of the pipe section.

8. In a pipe line as in claim 1, the detectors respectively disposed immediately adjacent to the welding seams.

* * * * *